United States Patent

[11] 3,586,997

| [72] | Inventor | Tracy S. Kinsel<br>Bridgewater Township, Somerset County, N.J. |
|---|---|---|
| [21] | Appl. No. | 827,817 |
| [22] | Filed | May 26, 1969 |
| [45] | Patented | June 22, 1971 |
| [73] | Assignee | Bell Telephone Laboratories, Incorporated<br>Murray Hill, N.J. |

[54] STABILIZED MODE-LOCKED LASER ARRANGEMENT
10 Claims, 3 Drawing Figs.

[52] U.S. Cl. .................................................. 331/94.5,
332/7.51, 250/199, 330/4.3, 332/19
[51] Int. Cl. ...................................................... H01s 3/10,
H03c 3/00
[50] Field of Search ........................................... 331/94.5;
330/7.51, 4.3; 250/199; 332/18, 19

[56] References Cited
UNITED STATES PATENTS

| 3,408,498 | 10/1968 | Ohm ............................. | 250/199 |
| 3,517,328 | 6/1970 | Jauan et al. ................... | 331/94.5 |

OTHER REFERENCES

Kinsel, " Light Wave of the Future; Optical PCM", ELECTRONICS Sept. 16, 1968, pp. 123-8.

*Primary Examiner*—Ronald L. Wilbert
*Assistant Examiner*—R. J. Webster
*Attorneys*—R. J. Guenther and Kenneth B. Hamlin ABSTRACT: It has been observed that the pulse-train output of a mode-locked Nd:YA1G laser exhibits a 180° phase instability. As a result it is not possible to achieve long term stable operation of such a laser by abstracting from the output pulse train a signal whose frequency corresponds to the axial-mode fundamental beat frequency. However, the phase of the second harmonic of this fundamental beat frequency which may be abstracted from the output pulse train does not exhibit such a 180° phase instability. Accordingly this second harmonic signal can be utilized as a discriminant from which a fundamental signal may be derived. In turn this derived fundamental signal is applied to drive an intracavity phase modulator. In this way the laser is stabilized in its mode-locked state by feedback techniques despite the aforementioned phase-instability characteristic.

INVENTOR
T. S. KINSEL
BY
Lucian C. Canepa
ATTORNEY

STABILIZED MODE-LOCKED LASER ARRANGEMENT

BACKGROUND OF THE INVENTION

1. Field of the Invention

This invention relates to signal translation and more particularly to stabilized mode-locked laser arrangements.

2. Description of the Prior Art

It is known to operate a multiaxial-mode laser arrangement in a mode-locked manner. This may be accomplished, for example, by driving an intracavity phase modulator of the arrangement by means of an external signal generator at or near the frequency which corresponds to the average axial mode spacing of the arrangement. (This frequency is $c/2L$ where $c$ is the speed of light and $L$ is the length of the laser cavity). Such an externally applied modulating signal introduces in the arrangement a time-varying perturbation which establishes a phase relationship between the oscillatory laser modes. As a result, the output of the laser is a periodic pulse train whose repetition rate is equal to the frequency of the external signal generator.

The neodymium-containing yttrium aluminum garnet (Nd:YA1G) laser developed by J. E. Geusic and L. G. Van Uitert (see U.S. Pat. No. 3,255,103, issued May 17, 1966) is an advantageous solid-state laser capable of continuous room temperature operation. For several reasons mode-locked operation of the Nd:YA1G laser is particularly desirable. First, mode-locking reduces the magnitude of the relaxation oscillations that may be present in the output of the Nd:YA1G laser. Such oscillations constitute a noise component whose presence is not desired. Second, the random phase variations observed in an unlocked Nd:YA1G laser give rise to large random variations in the average second harmonic power capable of being generated by such a laser. (The Nd:YA1G laser can be adapted to generate a second harmonic output by combining therewith a nonlinear optical material such as $Ba_2NaNb_5O_{15}$. For a description of such a combination see "Continuous $0.532\mu$ Solid-State Source Using $Ba_2NaNb_5O_{15}$," by J. E. Geusic, H. J. Levinstein, S. Singh, R. G. Smith and L. G. Van Uitert, *Applied Physics Letters*, May 1968, pages 306—308). Mode-locking of an Nd:YA1G laser operating as a second harmonic generator results in an almost constant second harmonic power output therefrom.

Mode-locking a laser by means of an externally applied modulating signal presents problems of long term stability. This is due to the fact that the $c/2L$ frequency of the laser and the frequency of the external signal must be synchronized. Any drifting of the external signal and/or changes in the length of the laser cavity can cause the two noted frequencies to fall out of synchronism whereby the laser will no longer exhibit a mode-locked behavior.

One approach to stabilizing the mode-locked operation of a laser is to detect the beats between axial modes thereof and to use this signal (at a frequency of $c/2L$ in a feedback loop that is coupled to the intracavity modulator. This arrangement operates as a feedback regenerative oscillator when the gain in the loop is sufficiently high to exceed the losses therein and when the phase shift in the loop is a multiple of 360°. In this way the laser supplies its own drive frequency for mode-locking.

A variant of the oscillator-loop technique is to form a servo loop in which an error signal is generated by the phase shift of the output pulses to correct the output frequency of an external generator that is arranged to drive the intracavity modulator. This configuration is in essence that of the well known phase-locked loop which is described, for example, in "Properties and Design of the Phase-Controlled Oscillator with a Saw-Tooth Comparator" by C. J. Byrne, *The Bell System Technical Journal*, Mar. 1962, pages 559—602.

It has been observed that the mode-locked pulse-train output of an Nd:YA1G laser exhibits a phase instability whose cause is not presently known. One output pulse train from the laser passes through the intracavity modulator when the phase retardation of the modulator is maximum whereas at other times an output train passes through the modulator when its retardation is minimum. These trains are displaced from each other by 180°. The laser jumps at random from one of these output conditions to the other and shows no apparent preference for either of them. As a result of these random phase fluctuations, the preset phase relationships established in the aforedescribed feedback loops are altered. As a consequence the laser arrangements fluctuate between stable and unstable operating conditions, which render the arrangements unsuitable for many applications of practical interest.

SUMMARY OF THE INVENTION

Accordingly an object of the present invention is an improved laser arrangement.

More specifically, an object of this invention is a feedback-stabilized mode-locked laser arrangement of the Nd:YA1G type.

Briefly stated, these and other objects of the present invention are realized in a specific illustrative embodiment thereof which comprises an Nd:YA1G laser arrangement including an intracavity phase modulator. Mode-locking of the laser is achieved by driving the modulator at a fundamental frequency that corresponds to the average axial mode spacing of the laser. However, because the pulse-train output of the laser exhibits a phase-instability characteristic, it is not sufficient merely to directly extract the fundamental frequency from the output of the laser. In accordance with the principles of this invention, the second harmonic of the fundamental beat frequency is extracted from the output and utilized in a feedback loop (of the oscillator or servo type) that is coupled to the modulator. The phase of this second harmonic signal does not exhibit the phase instability seen in the fundamental. Accordingly this signal can be used to recover the fundamental, with a predetermined phase. In turn, the fundamental signal is applied to drive the modulator.

It is therefore a feature of the present invention that the second harmonic of the average, mode-spacing frequency of a laser characterized by output phase instability be applied to a feedback loop and processed in the loop to provide a fundamental signal of a predetermined phase for driving an intracavity phase modulator. In this way stable mode-locked operation of the laser is achieved despite the phase-instability characteristic.

BRIEF DESCRIPTION OF THE DRAWING

A complete understanding of the present invention and of the above and other features and advantages thereof may be gained from a consideration of the following detailed description of specific illustrative embodiments thereof presented hereinbelow in connection with the accompanying drawing, in which.

DETAILED DESCRIPTION

Figure 1:
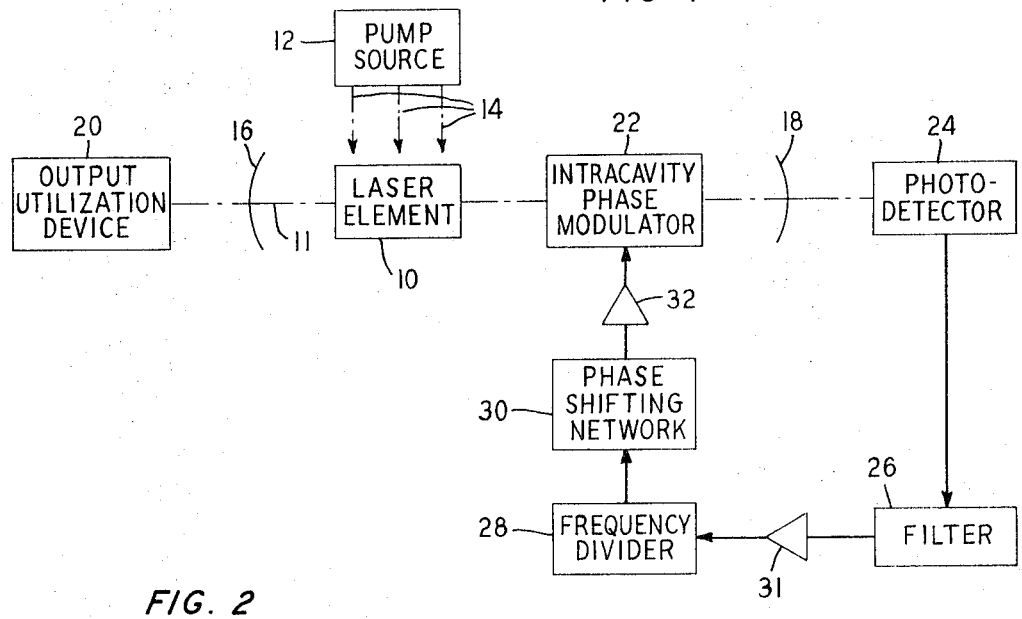
FIGS. 1 and 2 respectively show specific illustrative embodiments made in accordance with the principles of the present invention.

The specific illustrative laser arrangement shown in FIG. 1 includes a conventional laser element 10 which may, for example, comprise an Nd:YA1G rod of the type described in the aforecited Geusic-Van Uitert patent. Illustratively, the element 10 is a cylindrical rod whose main axis is coincident with the longitudinal axis 11 (dot-dash line) of the laser arrangement. Typically, the ends of the laser element 10 are flat, parallel and coated to be antireflective at a wavelength of 1.06 microns. Continuous pumping of the element 10 to achieve an output at 1.06 microns is achieved by means of a conventional pump source 12 whose radiant output, directed at the element 10, is represented by dashed arrows 14.

The laser element 10 of FIG. 1 is contained in a cavity defined by members 16 and 18. Illustratively, the member 16 is curved and selected to transmit to an output utilization device about 1.5 percent of the 1.06-micron radiation that impinges on the concave side thereof. (The remainder of this incident radiation is reflected to the right along the longitudinal axis 11.) The device 20 may, for example, comprise a workpiece such as a thin-film resistor whose characteristics are to be precisely controlled by laser micromachining techniques. For such purposes either the laser arrangement or the workpiece or both may be moved by conventional micropositioning apparatus (not shown).

Illustratively, the member 18 shown in FIG. 1 is also curved and selected to reflect all but a relatively small portion of the radiation directed at the concave side thereof. In one specific arrangement, the member 18 is adapted to transmit about 0.5 percent of the incident radiation.

A multiaxial-mode Nd:YAlG laser can be mode-locked thereby to provide an output that comprises a series of very narrow spaced-apart pulses. (In this connection, see "Generation of Ultrashort Optical Pulses by Mode Locking in the YAlG:Nd Laser," by M. DiDomenico, Jr., J. E. Geusic, H. M. Marcos and R. G. Smith, *Applied Physics Letters*, Apr. 1966, pages 180—183.). Illustratively, mode-locked operation of the laser shown in FIG. 1 can be achieved by positioning a conventional phase modulator 22 (for example an element made of lithium niobate) in the laser cavity in the path of the beam that propagates along the axis 11. In particular, mode locking is achieved by driving the modulator 22 with a signal whose frequency is at or near the average axial mode spacing of the laser. This frequency may lie anywhere within the so-called phase-locked region of the laser. In this region the output of the laser is a time-dependent series of pulses. This region is approximately centered about a frequency of $c/2L$. In FIG. 1, L is measured along the axis 11 and is the distance between the members 16 and 18.

An external signal generator (not shown) can be utilized to drive the modulator 22 shown in FIG. 1. It is advantageous, however, to configure the laser arrangement to supply its own modulating signal for mode-locking. Thus, as shown in FIG. 1, that portion of the output of the laser that is transmitted through the member 18 is applied to a feedback oscillator loop which is coupled to the modulator 22. To mode lock some lasers, it is sufficient to propagate in the feedback loop a signal at the average mode-spacing or $c/2L$ frequency. This approach, as applied to a helium-neon laser, is described in "Mode LOcking of CW Lasers by Regenerative RF Feedback," by G. R. Hugget, *Applied Physics Letters*, Sept. 1, 1968, pages 186—187. However, for a laser such as the Nd:YAlG one illustratively described herein, there exists a phase instability in the mode-locked pulse-train output thereof. The nature of this phase instability characteristic and the reason why its existence makes the Hugget-type approach unsatisfactory for mode locking such a laser, will be described below in connection with FIG. 3.

Figure 3:
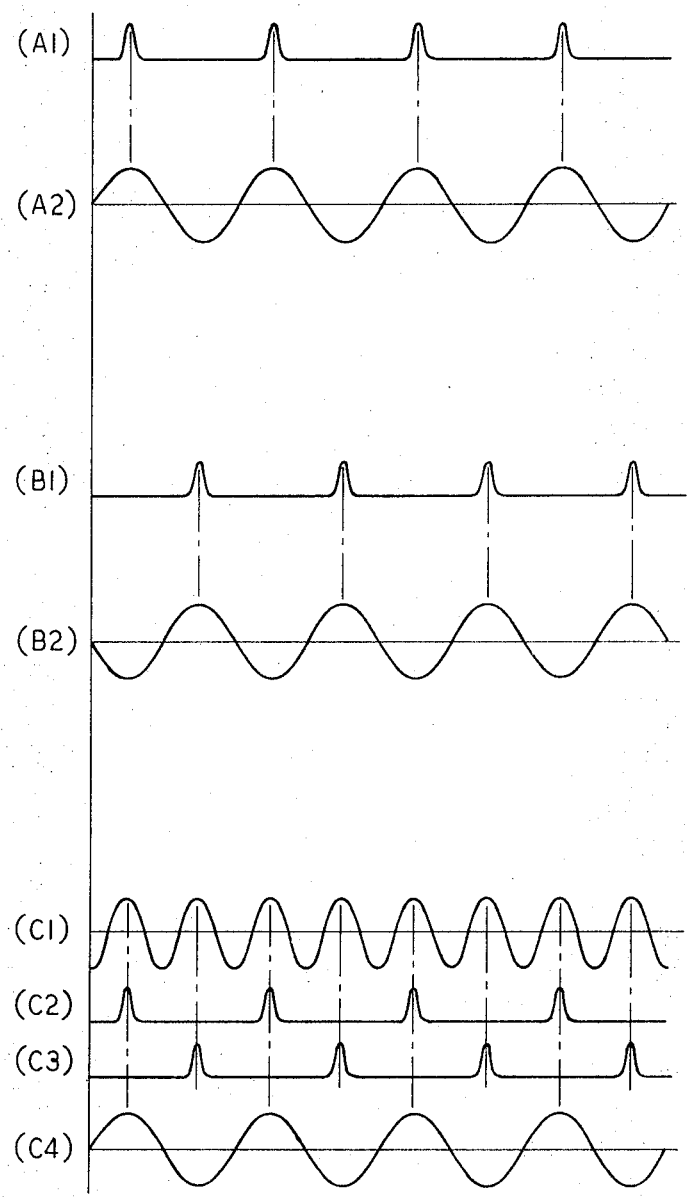
FIG. 3 depicts various waveforms that are helpful in understanding the mode of operation of the embodiments of FIGS. 1 and 2.

FIG. 3(A1) depicts the pulse-train output of a mode-locked laser. Illustratively, each of the depicted pulses exhibits a width of about 30 picoseconds, and the pulses occur at a repetitive rate of $c/2L$ which for illustrative purposes is assumed herein to be 300 MHz. By conventional signal recovery techniques, a sine-wave signal at 300 MHz. can be derived from the FIG. 3(A1) pulse train. The waveform of such a recovered signal is shown in FIG. 3(A2). The respective maxima of this continuous sine-wave signal occur in approximate time coincidence with the appearances of the pulses shown in FIG. 3(A1).

The 300 MHz. signal depicted in FIG. 3(A2) can, with suitable amplification and phase adjustment, be utilized in an oscillator loop for mode-locking purposes. In particular, the gain in the loop must be selected to be sufficiently high to exceed the losses therein and the phase shift around the loop must be adjusted to be a multiple of 360°. (In this way the modulating signal and the 1.06-micron laser signals will be synchronized). The necessary phase adjustment can be made with a conventional phase-shifting network.

Ideally, once the oscillator loop of a mode-locked laser is adjusted as specified, the laser should remain in the mode-locked state even if the laser cavity is subjected to mechanical and thermal perturbations.

As indicated above the Nd:YAlG laser exhibits a gross phase-instability characteristic in its output waveform. More specifically, it has been observed that the output pulse train of such a laser jumps back and forth at random from the condition represented in FIG. 3(A1) to that shown in FIG. 3(B1). These pulse trains are displaced from each other by 180°. For such a laser a fixed phase adjustment in the oscillator loop can be made for one or the other of the depicted output conditions. Thus, for example, the phase-shifting network in the loop can be adjusted such that the phase shift around the loop is a multiple of 360° for the FIG. 3(A2) waveform. Once made, however, that phase adjustment is obviously not correct for the sine-wave signal of FIG. 3(B2) which is derived from the FIG. 3(B1) pulse train. As a result a feedback-stabilized laser exhibiting this phase-instability phenomenon does not remain mode-locked, and the amplitude of its output waveform is observed to be modulated in a randomly fluctuating manner.

In accordance with the principles of the present invention, the aforementioned phase-instability problem is obviated. This accomplishment is based on the recognition that the phase of the second harmonic of the fundamental beat frequency is independent regardless of which one of the two above-described pulse-train outputs is being provided by the laser. This second harmonic signal is represented in FIG. 3(C1), and the two 180° displaced pulse-train outputs of the laser are reshown for convenience in FIGS. 3(C2) and 3(C3), respectively. The pulses in FIG. 3(C2) occur in approximate time coincidence with alternate maxima of the FIG. 3(C1) signal as do the pulses of FIG. 3(C3). It is evident, therefore, that recovery of a second harmonic signal at the frequency $c/L$ from the FIG. 3(C2) waveform yields a sine wave whose phase is identical to that of the second harmonic signal derived from The FIG. 3(C3) waveform. Illustratively, $c/L$ equals 600 MHz.

The oscillator-loop arrangement shown in FIG. 1 incorporates the second harmonic technique described herein. The optical pulse train that passes through the partially transmissive member 18 is directed at a photodetector 24 which, in a manner well known in the art, converts the incident radiation to a corresponding series of spaced-apart electrical pulses at a repetition rate of 300 MHz. These electrical signals are applied to a filter 26 which, for example, comprises a tuned amplifier adjusted to pass only a 600 MHz. sine wave, as shown in FIG. 3(C1). In turn this second harmonic sine wave is applied to a conventional frequency divider or synchronized oscillator 28 which is adapted to generate a 300 MHz. sine wave as shown in FIG. 3(C4). Since the drive to the frequency divider 28 does not exhibit a phase instability, the phase of the output thereof also does not exhibit this instability. Accordingly, once the phase of a standard phase-shifting network 30 is adjusted to make the phase shift around the loop a multiple of 360°, this required phase relationship is maintained regardless of which of the two phase-displaced pulse trains shown in FIGS. 3(C2) and 3(C3) is provided by the laser. As a result, the depicted laser arrangement operates in a stable mode-locked manner.

The required gain in the oscillator loop shown in FIG. 1 may be provided by the filter 26 and/or the frequency divider 28. Alternatively, separate amplifiers 31 and 32 may be included in the depicted loop to provide the required amplification.

As indicated above, an Nd:YAlG laser is well suited for operation as a second harmonic generator at 0.532 microns. If such operation is desired it may be achieved in the FIG. 1 embodiment by positioning a nonlinear optical element (made for example of $Ba_2Na_5O15$) in the laser cavity between the element 10 and the member 16.

Figure 2:
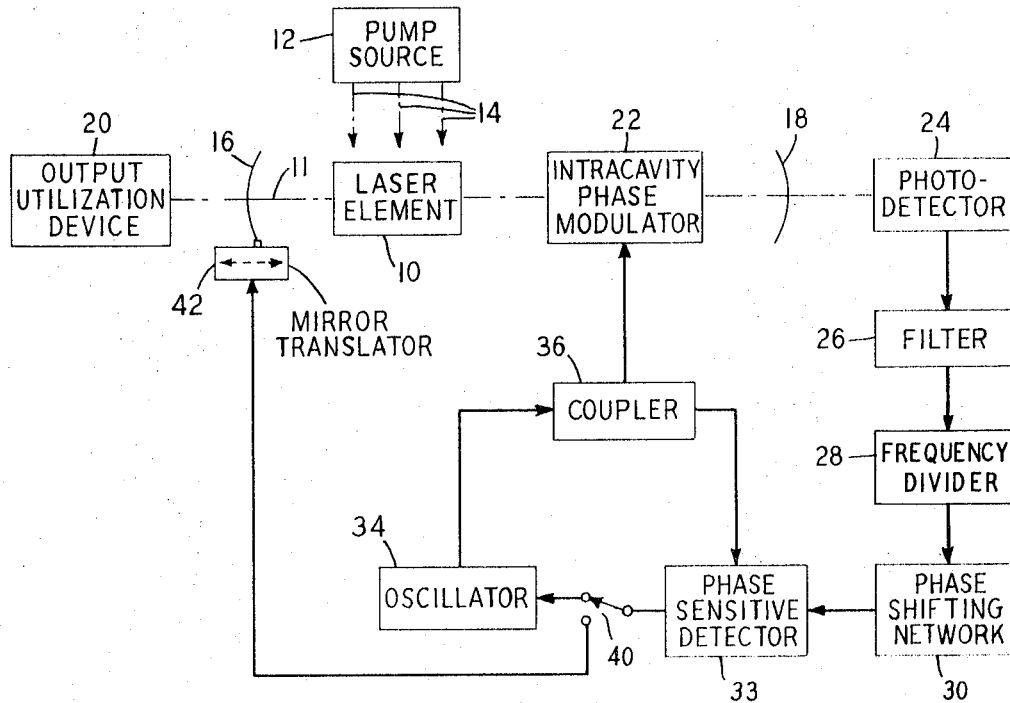

FIG. 2, which includes a servo loop, shows two other illustrative laser arrangements made in accordance with the principles of the present invention. Realization of one or the other of these two embodiments is accomplished simply by movement of a switch 40. With the switch 40 in its depicted position, an oscillator 34 is adapted to function as a voltage-controlled unit. On the other hand, when the switch 40 is thrown to its other or downwards position, the unit 34 is adapted to operate as a stable single-frequency oscillator.

Several of the components of the FIG. 2 arrangement may be identical to the corresponding components shown in FIG. 1. For ease of identification these components are designated in FIG. 2 with the same reference numerals employed therefore in FIG. 1. Moreover the output of the phase-shifting network 30 shown in FIG. 2 is identical to the output provided by the network 30 of FIG. 1. Thus the signal applied by the network 30 of FIG. 2 to a conventional phase-sensitive detector 33 is a 300 MHz. sine wave which has been derived from a second harmonic signal in the same manner described above in connection with the description of FIG. 1 and which therefore does not exhibit a phase instability.

FIG. 2 also includes a coupler 36 for applying to the detector 33 a predetermined portion of the output of the oscillator 34. The remainder of the output of the oscillator 34 is applied to drive the phase modulator 22 to achieve mode-locking of the depicted arrangement. In addition, FIG. 2 depicts a mirror translator 42 responsive (when the arm of the switch 40 is moved downwards) to the output of the detector 33 for bidirectionally moving the member 16 along the axis 11.

In a conventional manner with the switch 40 in its depicted condition, the detector 33 of FIG. 2 applies a correction signal to the voltage-controlled oscillator 34 whenever cavity perturbations or changes in the characteristics of the oscillator 34 cause the modulating signal and the laser signal to tend to fall out of synchronization. This self-adjusting operation is analogous to that which occurs in a standard phase-locked loop. What is different about the depicted arrangement is the embodiment therein of the unique second harmonic feedback technique described above. This technique makes such servo loop operation feasible even with a laser that exhibits a phase-instability characteristic with respect to its output pulse train waveform.

Another specific illustrative embodiment of the principles of the present invention is formed by moving the arm of the switch 40 downwards. In this case the output of the detector 33 is applied to the mirror translator 42 which may, for example, constitute a piezoelectric element secured to the member 16 or a translatable motor-driven mounting for the member 16. Any correction or error-signal output from the detector 33 is effective to move the member 16 (the member 18 can just as well be controlled) thereby to vary the length of the laser cavity and reestablish synchronization between the outputs of the oscillator 34 and the depicted laser.

A modification of the arrangements shown in FIG. 2 involves omitting the divider 28 and interposing a multiply-by-two circuit (not shown) between the coupler 36 and the detector 33. In such a modified arrangement the oscillator 34 still operates at the average fundamental mode-spacing frequency but both of the signals applied to the detector are at the second harmonic frequency. The operation and advantages of this modified arrangement are otherwise the same as those of the specific arrangement depicted in FIG. 2.

It is to be understood that the above-described arrangements are only illustrative of the application of the principles of the present invention. In accordance with these principles of numerous other arrangements may be devised by those skilled in the art without departing from the spirit and scope of the invention. For example, although specific emphasis herein has been directed to an Nd:YA1G laser arrangement, it is to be understood that the principles of the invention are applicable to any mode-locked laser arrangement that inherently provides a phase-unstable output.

What I claim is:

1. In combination, a multiaxial-mode laser comprising a cavity and a modulator positioned within said cavity, and feedback means for abstracting a signal from said laser cavity only at twice the frequency that corresponds to the average axial mode spacing of the laser and for processing said signal to drive said modulator at or near the average mode-spacing frequency in the phase-locked region of operation of said laser to achieve mode-locked operation.

2. A combination as in claim 1 further including
voltage-controlled oscillator means for applying a modulating signal to said modulator, and a phase-sensitive detector responsive to the output of said oscillator means and to said signal at or near the average mode-spacing frequency for applying a correction signal to said oscillator means to maintain the output of said laser and the output of said oscillator means in synchronism thereby to achieve mode-locked operation of said laser.

3. A combination as in claim 1 further including
means for controlling the length of said cavity,
single-frequency oscillator means for applying a modulating signal to said modulator, and a phase-sensitive detector responsive to the output of said oscillator means and to said signal at or near the average mode-spacing frequency for applying a correction signal to said controlling means to maintain the output of said laser and the output of said oscillator means in synchronism thereby to achieve mode-locked operation of said laser.

4. In combination in a mode-locked multiaxial-mode laser arrangement whose output waveform is characterized by a phase-instability phenomenon,
a laser cavity having a main axis,
a laser element and a phase modulator both positioned within said cavity along said axis,
and a feedback circuit extending between said cavity and said modulator, said circuit comprising
means for extracting from said cavity a second-harmonic signal at twice the frequency that corresponds to the average spacing between the multiple modes capable of being propagated in said cavity,
means responsive to said extracting means for providing a signal, at the average mode-spacing frequency, which does not exhibit said phase instability,
means for shifting the phase of said signal at the average mode-spacing frequency by a predetermined amount,
and means responsive to said phase-shifted signal at the average mode-spacing frequency for driving said modulator at the average mode-spacing frequency to achieve stable mode-locked operation of said arrangement.

5. A combination as in claim 4 wherein said cavity comprises a partially transmissive member for propagating an optical signal outside said cavity, and wherein said extracting means comprises a photodector disposed to receive the signal transmitted through said member.

6. A combination as in claim 5 wherein said extracting means further includes a filter connected to the output of said photodetector for passing only said second-harmonic signal.

7. A combination as in claim 6 wherein said providing means comprises a divide-frequency-by-two synchronized oscillator connected to the output of said filter.

8. A combination as in claim 7 wherein said shifting means comprises a phase-shifting network connected to the output of said oscillator for adjusting the total phase shift in said feedback circuit to a multiple of 360°.

9. A combination as in claim 8 wherein said driving means comprises a direct electrical connection between said modulator and the output of said phase-shifting network.

10. A combination as in claim 8 wherein said driving means comprises
a two-input phase-sensitive detector having one input thereof connected to the output of said phase-shifting network,
a voltage-controlled oscillator unit adapted to provide an output signal at said average mode-spacing frequency and
a coupler responsive to the output signal of said unit for applying a portion of said output signal to the other input of said phase-sensitive detector and for applying the remainder of said output signal to said modulator.